United States Patent
Anandan et al.

(10) Patent No.: US 8,999,553 B2
(45) Date of Patent: Apr. 7, 2015

(54) RECHARGEABLE BATTERY WITH SHUTDOWN LAYER COMPRISING A LOW MELTING POINT MATERIAL AND AN ELECTRICALLY CONDUCTIVE MATERIAL

(71) Applicant: Ford Global Technologies, LLC, Dearborn, MI (US)

(72) Inventors: Venkataramani Anandan, Farmington Hills, MI (US); Andrew Robert Drews, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 13/834,124

(22) Filed: Mar. 15, 2013

(65) Prior Publication Data
US 2014/0272489 A1    Sep. 18, 2014

(51) Int. Cl.
| H01M 2/14 | (2006.01) |
| H01M 2/34 | (2006.01) |
| H01M 10/04 | (2006.01) |
| H01M 2/16 | (2006.01) |
| H01M 2/02 | (2006.01) |

(52) U.S. Cl.
CPC ........... *H01M 2/348* (2013.01); *H01M 2/1686* (2013.01); *H01M 2/16* (2013.01); *H01M 2/0207* (2013.01)

(58) Field of Classification Search
CPC ..... H01M 2/348; H01M 2/16; H01M 2/1686; H01M 2/0207
USPC .......... 429/212, 129, 231.8, 58, 61; 29/623.1, 29/623.5; 427/77
See application file for complete search history.

(56) References Cited

U.S. PATENT DOCUMENTS

| 668,215 | A | * | 2/1901 | Reed ............................ 429/212 |
| 1,594,810 | A | * | 8/1926 | Benner et al. ................. 252/510 |
| 2,834,826 | A | * | 5/1958 | George et al. ................. 427/115 |
| 4,075,400 | A | | 2/1978 | Fritts |
| 6,511,517 | B1 | | 1/2003 | Ullrich et al. |
| 7,931,979 | B2 | | 4/2011 | Choi et al. |
| 2008/0138700 | A1 | * | 6/2008 | Horpel et al. ................. 429/129 |
| 2009/0023064 | A1 | | 1/2009 | Kim et al. |
| 2011/0217595 | A1 | * | 9/2011 | Kelnberger et al. .......... 429/248 |
| 2011/0256443 | A1 | | 10/2011 | Park et al. |

FOREIGN PATENT DOCUMENTS

| JP | 1050348 | 2/1998 |
| KR | 20070112486 A | 11/2007 |
| WO | 2007/033734 A1 | 3/2007 |

OTHER PUBLICATIONS

Baginska, M. et al., "Autonomic Shutdown of Lithium-Ion Batteries Using Thermoresponsive Microspheres," Adv. Energy Mater. 2012, 2, pp. 583-590.

* cited by examiner

*Primary Examiner* — Kenneth Douyette
(74) *Attorney, Agent, or Firm* — Damian Porcari; Brooks Kushman P.C.

(57) ABSTRACT

In at least one embodiment, a battery is provided comprising an anode and cathode, a separator between the anode and cathode, and a shutdown layer between the separator and the anode or cathode. The shutdown layer may include low melting point material and a conductive material within the low melting point material forming a conductive network within the shutdown layer. At a melting point temperature of the low melting point material, the conductive network is reduced such that at least a portion of the shutdown layer is substantially electrically non-conductive. The shutdown layer may be a free-standing layer or may be coated one or both of the electrodes.

20 Claims, 2 Drawing Sheets

RECHARGEABLE BATTERY WITH SHUTDOWN LAYER COMPRISING A LOW MELTING POINT MATERIAL AND AN ELECTRICALLY CONDUCTIVE MATERIAL

TECHNICAL FIELD

One or more embodiments relate to a shutdown layer for preventing thermal runaway in rechargeable batteries.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. A HEV includes an internal combustion engine and an electric motor, wherein the energy source for the engine is fuel and the energy source for the motor is a battery. A PHEV is like a HEV, but the PHEV has a larger capacity battery that is rechargeable from the external electric grid. Lithium-ion (Li-ion) batteries are used in BEV, HEV, and PHEV. Due to the nature of vehicle application, these Li-ion batteries are exposed to potential electrical and mechanical abuse during their lifetime. Such abuse may induce a short-circuit internal to the battery cell.

SUMMARY

In at least one embodiment, a battery is provided comprising an anode and cathode, a separator between the anode and cathode, and a shutdown layer between the separator and the anode or cathode. The shutdown layer may include a wax material and a conductive material within the wax material forming a conductive network within the shutdown layer. At a wax material melting point temperature, the conductive network is reduced such that at least a portion of the shutdown layer is substantially electrically non-conductive.

In one embodiment, below the melting point temperature of the wax material, the shutdown layer is electrically conductive. In another embodiment, the conductive material includes conductive particles, which may be conductive carbon. The wax material may include a number of grain boundaries, and the conductive particles may be disposed at the number of grain boundaries of the wax material. A shutdown layer may be disposed between the separator and the anode and between the separator and the cathode. In one embodiment, the wax material comprises from 10 to 90 weight percent of the shutdown layer. In another embodiment, the conductive material comprises from 1 to 30 weight percent of the shutdown layer. The wax material may be a paraffin wax. In one embodiment, the shutdown layer has a thickness of 1 to 50 μm. In another embodiment, the wax material has a melting point of 70 to 150° C.

In at least one embodiment, a method of forming a shutdown layer for a rechargeable battery is provided, comprising preparing a mixture of a wax material and a plurality of conductive particles, coating the mixture onto a battery electrode, and drying the mixture to obtain a dried mixture including a conductive network within the wax material to obtain a shutdown layer. At a melting point temperature of the wax material, the conductive network may be reduced such that at least a portion of the shutdown layer is substantially electrically non-conductive.

In one embodiment, the conductive particles include conductive carbon. Upon drying, the wax material may include a number of grain boundaries and the conductive particles may be disposed at the number of grain boundaries. In one embodiment, the shutdown layer has a thickness of 1 to 50 μm. In another embodiment, the wax material comprises from 10 to 90 weight percent of the mixture. In another embodiment, the conductive material comprises from 1 to 30 weight percent of the shutdown layer. The mixture may be coated onto a battery anode and a battery cathode. The wax material may be a paraffin wax.

In at least one embodiment, a battery is provided comprising an anode, a cathode, a separator between the anode and cathode, and a shutdown layer between the separator and the anode or the cathode. The shutdown layer may consist essentially of a low melting point (LMP) material and a conductive material distributed throughout the LMP material and forming a conductive network within the shutdown layer. At a melting point temperature of the LMP material, the conductive network may be reduced such that at least a portion of the shutdown layer is substantially electrically non-conductive.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
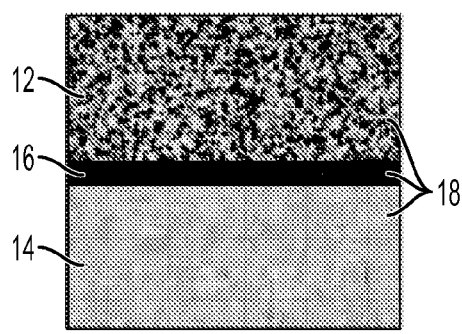
FIG. 1 is a schematic cross section of a conventional Li-ion battery.

With reference to FIG. 1, a typical lithium-ion battery (Li-ion battery) 10 is illustrated having an anode 12, cathode 14, and a separator 16. An electrolyte 18 is generally present at within the anode 12, cathode 14, and separator 16. The anode 12 and cathode 14 are typically attached on one side to a current collector (not shown). Lithium ions move from the anode to the cathode during discharge and from the cathode to the anode during charge. Lithium-ion batteries may be electrically connected in series to form a battery pack for an automotive vehicle. Power from such a battery pack may be used to generate motive power, via an electric machine, to move the vehicle.

One safety concern with Li-ion batteries is thermal runaway, in which an exothermic reaction occurs that, in turn, causes or hastens further exothermic reactions, analogous to a positive feedback loop. The initial exothermic reaction may be caused by a rise in temperature and may involve an exothermic decomposition of the solid electrolyte interphase (SEI) layer on the negative electrode, followed by an electrolyte decomposition reaction between the electrodes and the electrolyte. These reactions may release gas and fuel a runaway reaction that could eventually lead to combustion or explosion of the battery. One possible cause of the initial rise in temperature can be an internal short circuit of the battery, wherein the battery cell discharges through the short circuited spot and Joule heating occurs in the region local to the short circuit.

Internal short circuits (shorts) may occur for a number of reasons and by various mechanisms. For example, the separator may be defective or may wear out over time, there may be metal dissolution or deposition at the anode and/or cathode surface, or there may be metal particles (e.g., dendrites) or debris that penetrate the separator and connect the anode and cathode. Various short mechanisms may include, for example, electrical contact from one current collector to an opposing current collector through the electrodes and separator, a separator puncture or worn opening allowing electrical contact between the anode and cathode, or electrical contact from one electrode to an opposing current collector (e.g. from a metal particle).

Once an internal short occurs, it may be desirable to electrically isolate the short from the rest of the conductive material from the electrodes to prevent a thermal runaway. It would also be beneficial if thermal runaway could be prevented while still leaving the battery operable, albeit with a potentially lower capacity. Prior attempts to address the problem of thermal runaway have involved automatic shutdown separators and external fuses. Automatic shutdown separators typically involve a low melting point material that melts to prevent the transport of ionic current in the vicinity of the short circuit. This approach does not address an internal short itself, as it allows the transport of ionic current to continue in unaffected portions of the battery. The result is that overall ionic current may be virtually unaffected and self-discharge continues via the short circuit. Self-discharge can only be completely stopped once the entire shutdown separator has melted to completely stop ionic current transport. Similarly, external fuses cannot prevent self-discharge, since they do not operate within the cell.

Figure 2:
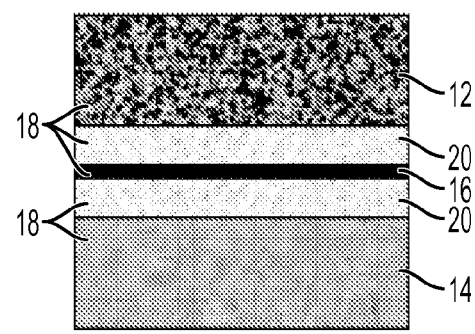
FIG. 2 is a schematic cross section of a battery having a shutdown layer according to one embodiment.
Figure 3:
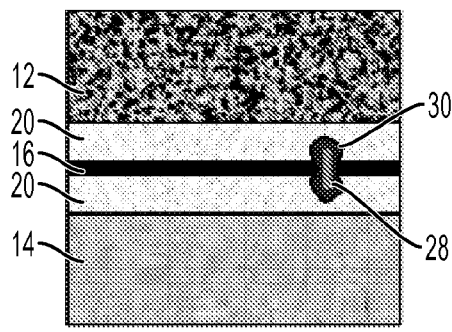
FIG. 3 illustrates an example of a shutdown layer melting in a region local to a short circuit.
Figure 4:
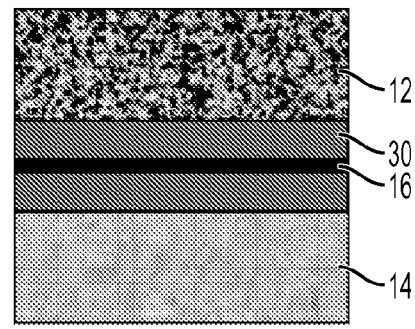
FIG. 4 illustrates an example of a shutdown layer melting in its entirety in response to overcharge or over-discharge.

With reference to FIGS. 2-4, an embodiment of a Li-ion battery 10 is provided having an anode 12, cathode 14, and separator 16. An electrolyte 18 disposed within the anode 12, cathode 14, and separator 16. While a Li-ion battery is illustrated, the battery 10 may be any type of rechargeable (secondary) battery having an anode, cathode, and separator. In addition, a shutdown layer 20 is provided which is configured to electrically disconnect an internal short circuit structure from the electrodes (anode 12 and/or cathode 14), limit the extent of self-discharge, and prevent thermal runaway. In at least one embodiment, the shutdown layer 20 is disposed between the separator 16 and one of the anode 12 and cathode 14. In other embodiments, a shutdown layer 20 is disposed between both the separator 16 and anode 12 and the separator 16 and cathode 14.

In at least one embodiment, the shutdown layer 20 includes a low melting point (LMP) material 22 and a conductive material 24. LMP material 22 may be a polymer or a wax material, which can be cast to form a porous layer on casting. This material may provide mechanical support to the conductive material 24 and ionic conduction between electrodes. The ionic conduction occurs through the liquid electrolyte present in the pore channels of the layer 20. The conductive material 24 is an electron conducting material which forms a conductive network 26 within the shutdown layer 20 such that the layer 20 is electrically conductive when the LMP material 22 is in a solid state. However, when the internal temperature of a region of the battery 10 reaches a temperature above the melting point temperature of the LMP material 22, possibly due to an internal short circuit, the LMP material 22 in that region melts and the conductive network 26 of the region is disrupted or eliminated. When the conductive network 26 of a region is disrupted, the shutdown layer 20 is substantially electrically non-conductive in that region. While conductive and resistive may be considered relative terms, as used herein, "substantially electrically non-conductive" may mean that the layer 20 in the region has sufficient resistance to electrical current that it would be considered an insulator. For example, the resistance of the melted LMP material 22 may be at least 1 MΩ or at least 10 MΩ or at least 100 MΩ The non-conductive region of the shutdown layer 20 therefore disconnects the internal short circuit electrically from the remainder of the battery components (e.g. anode 12, cathode 14, and current collectors) and limits or eliminates self-discharge of the battery 10.

An example of the operation of the shutdown layer is illustrated in FIGS. 3 and 4. In FIG. 3, a short circuit 28 has occurred through a breach in the separator 16. As current passes through the short 28, Joule heating occurs and the temperature in the region local to the short 28 rises. Once the temperature reaches the melting point of the LMP material 22 of the shutdown layer 20, the LMP material begins to melt, forming a region of liquid LMP material 30 which disrupts the conductive network 26. The remaining portion of the shutdown layer 20 is unaffected and operates normally.

FIG. 4 illustrates an example of the operation of the shutdown layer 20 if overcharge or over-discharge occurs. Overcharge can lead to oxidation of the electrolyte and production of gases, as well as rapid temperature increase. Overcharge can also lead to dendrite growth, which can in turn lead to additional short circuits. If either overcharge or over-discharge are severe, it may lead to a temperature rise within the entire shutdown layer 20. If such widespread temperature rise occurs, substantially all of the LMP material 22 will melt, resulting in the disruption of conductive network and closing of pores of the layer 20. The result will be a significant decrease in or elimination of ionic transport through the battery 10.

A benefit of the battery 10 having a shutdown layer 20 over previous approaches to addressing thermal runaway is that the shutdown layer 20 is able to disconnect effectively the short circuit and limit or eliminate self-discharge of the battery 10, but leave the remaining portions of the battery 10 unaffected and still operational (e.g. ionic transport of electrolyte 18 continues). Prior approaches shut down all ionic transport and permanently deactivate the battery or they prevent ionic transport in the short circuited area but do not address the short circuit itself, allowing continued self-discharge.

The LMP material 22 may be any suitable material having a melting point within the high or "dangerous" temperature range for Li-ion batteries, such that below the high or dangerous temperature range the LMP material 22 is in a solid state and is able to support the conductive material 24 and the conductive network 26. Above the melting point, the LMP material 22 becomes a liquid and the conductive network 26 is destroyed, as discussed above. The LMP material 22 must also allow ionic transport when in a solid state but must reduce or prevent it when in a liquid or melted state. In at least one embodiment, the melting point of the LMP material 22 is between 60 and 200° C. In another embodiment, the melting point of the LMP material 22 is between 70 and 150° C. In another embodiment, the melting point of the LMP material 22 is between 70 and 120° C.

In at least one embodiment, the LMP material 22 may be a wax. Types of waxes that may be used include animal, vegetable, mineral, petroleum, and synthetic waxes, although other types not listed may be suitable as well. A non-exhaustive list of specific waxes that may be used include paraffin wax, polyethylene wax (and other polyolefin waxes), and Fischer-Tropsch wax. In addition to waxes, the LMP material 22 may be a polymeric material, such as a polyolefin. Examples may include polyethylene or polypropylene and their copolymers or blends. Other examples include, but are not limited to, polyesters such as polyethylene terephthalate, polybutylene terephthalate; polyamides such as nylons; halogenated vinyl or vinylidene polymers such as poly(vinylidene fluoride), polyvinyl chloride, poly(vinylidene chloride), polyvinyl chloride; polyethers such as polyethylene oxide, polypropylene oxides; polyvinyls such as polyvinyl alcohol, polyvinyl acetate, polystyrene, polyvinyl butryal, polymethyl vinyl ether, polyethyl vinyl ether; other polymers such as poly(methyl methacrylate), polycarbonates, polyurethane, ethylene vinyl acetate, styrene-butadiene-rubber may also be used. In some cases, one or more of these above polymers can be blended together to be used as LMP. In one embodiment, polyurethane along with stearic acid may be used.

In at least one embodiment, the conductive material 24 may be formed as conductive particles 32. The particles 32 may be formed from any suitable conductive material, for example conductive carbon particles or conductive metal particles. Examples of carbon may include, but are not limited to, carbon black, graphite, carbon nanofiber, carbon nanotubes, and graphene. Similarly, examples of metallic particles may include, but are not limited to, copper, nickel, aluminum, gold, platinum, palladium, silver, iron, tin, chromium, titanium. Conductive material 24 may be in the form of, but not limited to, nanoparticles, nanofiber, nanowire, nanopillars, nanotubes, nanoflakes, etc.

Figure 5:
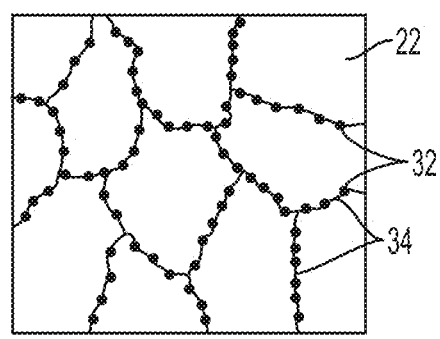
FIG. 5 illustrates an embodiment of a shutdown layer in which conductive particles are located at the grain boundaries of the low melting point material.

With reference to FIG. 5, in at least one embodiment, the particles 32 are located in the grain boundaries 34 of the LMP material 22 when the shutdown layer 20 is in a solid state, thereby forming the conductive network 26. The particles 32 may be located at the grain boundaries 34 of the LMP material 22 due to immiscibility of the LMP 22 material and the particles 32. For example, if conductive particles 32 formed from conductive carbon are mixed with or added to liquid paraffin wax (the LMP material 22) and the wax is allowed to solidify, then the conductive carbon particles may migrate to the grain boundaries 34 of the paraffin wax during solidification and form the conductive network 26. While segregation of the conductive material 24 or particles 32 to the grain boundaries 34 of the LMP material 22 is one suitable method of forming the conductive network, other mechanisms are possible. In general, the conductive network 26 is established when the conductive material 24 concentration is above the percolation threshold. The percolation threshold is the minimum conductive material concentration where electrical conduction first appears. In at least one embodiment, the conductive particles 32 have a size or diameter of 1 to 5,000 nm. In another embodiment, the conductive particles 32 have a size or diameter of 10 to 200 nm. In another embodiment, the conductive particles 32 have a size or diameter of 10 to 50 nm.

Figure 6:
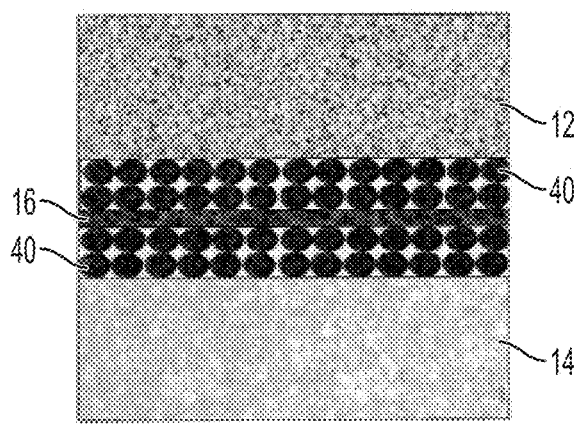
FIG. 6 illustrates an embodiment of a shutdown layer including composite microspheres.

In at least one embodiment, illustrated in FIG. 6, the shutdown layer 20 can include composite microspheres 40. The layer 20 may be made up of composite microspheres 40 which contain low melting point (LMP) material 22 and an electrically conductive material 24. The shutdown layer 20 is obtained by casting the slurry, containing composite microspheres 40, binder and a solvent, on the electrodes. Unlike a conventional thin layer, which sometime shrinks during melting, the layer with microspheres 40 will form a conformal coating on the electrode surface once melted. In at least one embodiment, the composite microspheres 40 have a size or diameter of 1 µm to 500 µm. In another embodiment, the microspheres 40 have a size or diameter of 1 µm to 200 µm. In another embodiment, the microspheres 40 have a size or diameter of 1 µm to 50 µm.

The LMP material 22 and the conductive material 24 (or conductive particles 32) may be present in the shutdown layer 20 in amounts such that the shutdown layer 20 is highly electrically conductive when in a solid state but resistive when the LMP material 22 melts and the conductive network 26 is eliminated. For example, when the LMP material 22 melts, the shutdown layer 20 may be substantially electrically non-conductive or highly resistive. In at least one embodiment, the LMP material 22 may comprise from 1 to 99 weight percent of the shutdown layer 20. In another embodiment, the LMP material 22 may comprise from 10 to 90 weight percent of the shutdown layer 20. In another embodiment, the LMP material 22 may comprise from 30 to 90 weight percent of the shutdown layer 20. In at least one embodiment, the conductive material 24 or conductive particles 32 may comprise from 0.1 to 50 weight percent of the shutdown layer 20. In another embodiment, the conductive material 24 or conductive particles 32 may comprise from 1 to 30 weight percent of the shutdown layer 20. In another embodiment, the conductive material 24 or conductive particles 32 may comprise from 1 to 20 weight percent of the shutdown layer 20.

A shutdown layer 20 may be disposed between the separator 16 and the anode 12, the separator 16 and the cathode 14, or both. In at least one embodiment, the shutdown layer 20 is a free standing layer, while in other embodiments, it is coated on the electrode surface. When the shutdown layer 20 is fabricated separately as a free standing layer, this method provides additional flexibility in process conditions to control the layer parameters (e.g., pore size, pore volume, pore structure) which may otherwise have been limited because of the presence of electrode and separators. Further, the fabrication process will not affect the quality of electrode or separators. For example, when a slurry containing the materials of the shutdown layer is coated on either the electrodes or the separator, the slurry may penetrate into the pores of the separator or electrode, and change their physical properties. In embodiments where the shutdown layer 20 is coated on or otherwise applied to the electrodes 12, 14 prior to the assembly of the battery 10, coating may be done in any suitable manner, such as dip or spray coating, knife/blade coating, deposition coating (e.g., PVD, CVD, or sputtering), or others. The shutdown layer 20 may also be applied to the separator 16, however there is an increased risk that the conductive material 24 may penetrate the pores of the separator 16, which may increase the likelihood of a short-circuit rather than protect against their occurrence.

The shutdown layer 20 may have a thickness that is large enough to provide sufficient LMP material 22 in order to disconnect a short circuit, but small enough to avoid negatively impacting ionic transport of the electrolyte. In at least one embodiment, the shutdown layer 20 has a thickness (e.g. the transverse distance from the separator 16 to the opposing electrode) of 0.1 to 100 µm. In another embodiment, the shutdown layer 20 has a thickness of 1 to 50 µm. In another embodiment, the shutdown layer 20 has a thickness of 1 to 30 µm.

In at least one embodiment, the shutdown layer 20 includes substantially only the LMP material 22 and the conductive material 24 (e.g., a wax and conductive particles). The two-component shutdown layer 20 therefore does not require additional materials or components to disconnect short circuits or prevent thermal runaway. Reducing the number of components to two may reduce complexity and simplify the production and coating process. Examples of additional components that may be eliminated or avoided in the shutdown layer 20 are binders and non-electrically conductive particles, which may include polymeric particles, ceramic particles, organic particles, inorganic particles, or others.

The electrolyte 18, may be a liquid electrolyte. Liquid electrolytes that may be suitable for the battery include various lithium salts, such as $LiPF_6$, $LiBF_4$ or $LiClO_4$ in an organic solvent, such as ethylene carbonate, dimethyl carbonate, and diethyl carbonate. However, it should be understood that any suitable Li-ion electrolyte is within the scope of the invention. The separator 16 may be any suitable Li-ion separator, such as a polyolefin or another porous polymer. Examples include polyethylene and polypropylene. In at least one embodiment, the separator 16 is an extruded microporous polyolefin membrane.

The anode 12 (negative electrode) may be formed of any suitable material, for example graphite (natural, artificial, or surface-modified natural), hard carbon, soft carbon, tin-enriched graphite or carbonaceous compounds, and lithium titanate oxide (LTO). Similarly, the cathode 14 (positive electrode) may be formed of any suitable material, for example lithium nickel cobalt aluminum oxide (NCA), lithium nickel manganese cobalt oxide (NMC), lithium manganese spinel oxide (Mn Spinel or LMO), and lithium iron phosphate (LFP) and its derivatives lithium mixed metal phosphate (LFMP). In addition, mixtures of any of two or more of these materials may be used, for example a mixture of NMC and LMO.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A lithium-ion battery comprising:
    an anode and cathode;
    a separator between the anode and cathode; and
    a shutdown layer between the separator and the anode or cathode, including a wax material and an electrically conductive material within the wax material and forming a conductive network within the shutdown layer, at a wax material melting point temperature, the conductive network is reduced such that at least a portion of the shutdown layer is substantially electrically non-conductive.

2. The battery of claim 1, wherein below the melting point temperature of the wax material, the shutdown layer is electrically conductive.

3. The battery of claim 1, wherein the electrically conductive material includes electrically conductive particles.

4. The battery of claim 3, wherein the wax material includes a number of grain boundaries, and the electrically conductive particles are disposed at the number of grain boundaries of the wax material.

5. The battery of claim 3, wherein the electrically conductive particles include conductive carbon.

6. The battery of claim 1, wherein a shutdown layer is disposed between the separator and the anode and between the separator and the cathode.

7. The battery of claim 1, wherein the wax material comprises from 10 to 90 weight percent of the shutdown layer.

8. The battery of claim 1, wherein the electrically conductive material comprises from 1 to 30 weight percent of the shutdown layer.

9. The battery of claim 1, wherein the wax material is a paraffin wax.

10. The battery of claim 1, wherein the shutdown layer has a thickness of 1 to 50 μm.

11. The battery of claim 1, wherein the wax material has a melting point of 70 to 150° C.

12. A method of forming a lithium-ion battery including a shutdown layer, the method comprising:
    preparing a mixture of a wax material and a plurality of electrically conductive particles;
    coating the mixture onto a battery anode or cathode;
    drying the mixture to obtain a dried mixture including a conductive network within the wax material to obtain a shutdown layer in which at a melting point temperature of the wax material, the conductive network is reduced such that at least a portion of the shutdown layer is substantially electrically non-conductive; and
    forming a lithium-ion battery including an anode and a cathode, a separator between the anode and the cathode, and the shutdown layer between the separator and the anode or the cathode.

13. The method of claim 12, wherein the electrically conductive particles include conductive carbon.

14. The method of claim 12, wherein upon drying, the wax material includes a number of grain boundaries and the electrically conductive particles are disposed at the number of grain boundaries.

15. The method of claim 12, wherein the shutdown layer has a thickness of 1 to 50 μm.

16. The method of claim 12, wherein the wax material comprises from 10 to 90 weight percent of the mixture.

17. The method of claim 12, wherein the electrically conductive particles comprise from 1 to 30 weight percent of the shutdown layer.

18. The method of claim 12, wherein the mixture is coated onto a battery anode and a battery cathode.

19. The method of claim 12, wherein the wax material is a paraffin wax.

20. A lithium-ion battery comprising:
    an anode;
    a cathode;
    a separator between the anode and cathode; and
    a shutdown layer between the separator and the anode or the cathode and consisting essentially of a low melting point (LMP) material having a melting temperature between 60° C. and 200° C. and an electrically conductive material distributed throughout the LMP material and forming a conductive network within the shutdown layer; and at a melting point temperature of the LMP material, the conductive network is reduced such that at least a portion of the shutdown layer is substantially electrically non-conductive.

* * * * *